(12) United States Patent
Badouin et al.

(10) Patent No.: US 11,450,208 B2
(45) Date of Patent: Sep. 20, 2022

(54) METHOD FOR TRANSFERRING A MOTOR VEHICLE TO AN AUTOMATIC PARKING SYSTEM, AUTOMATIC PARKING SYSTEM, AND MOTOR VEHICLE

(71) Applicant: AUDI AG, Ingolstadt (DE)

(72) Inventors: David Alexander Badouin, Ingolstadt (DE); Christian Feist, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 16/980,272

(22) PCT Filed: Mar. 7, 2019

(86) PCT No.: PCT/EP2019/055713
§ 371 (c)(1),
(2) Date: Sep. 11, 2020

(87) PCT Pub. No.: WO2019/175015
PCT Pub. Date: Sep. 19, 2019

(65) Prior Publication Data
US 2021/0027626 A1 Jan. 28, 2021

(30) Foreign Application Priority Data
Mar. 12, 2018 (DE) ...................... 10 2018 203 685.3

(51) Int. Cl.
*G07C 9/30* (2020.01)
*G08G 1/14* (2006.01)
(Continued)

(52) U.S. Cl.
CPC ............. *G08G 1/143* (2013.01); *E04H 6/422* (2013.01); *G07F 17/244* (2013.01); *G08G 1/144* (2013.01); *G08G 1/146* (2013.01)

(58) Field of Classification Search
CPC ..................................................... G08G 1/143
See application file for complete search history.

(56) References Cited

U.S. PATENT DOCUMENTS 10,008,120 B2   6/2018  Nordbruch
10,053,090 B2   8/2018  Buschenfeld et al.
(Continued)

FOREIGN PATENT DOCUMENTS

CN    104077851 A    10/2004
CN      1564168 A     1/2005
(Continued)

OTHER PUBLICATIONS

International Preliminary Report on Patentability directed to related International Patent Application No. PCT/EP2019/055713, dated Sep. 15, 2020, with attached English-language translation; 13 pages.
(Continued)

*Primary Examiner* — Joseph H Feild
*Assistant Examiner* — Pameshanand Mahase
(74) *Attorney, Agent, or Firm* — Sterne, Kessler, Goldstein & Fox P.L.L.C.

(57) ABSTRACT

The disclosure relates to a method for transferring a motor vehicle to an automatic parking system which is designed to transfer the motor vehicle to a free parking space of the parking system without a driver. The parking system transmits a release code (C) to the motor vehicle, said release code being output in the motor vehicle so as to be perceivable to a motor vehicle user. After leaving the motor vehicle, the motor vehicle user transmits the release code to the parking system in order to grant a drive release. As soon as the drive release is granted, the motor vehicle is transferred to the free parking space of the parking system without the driver. The disclosure additionally relates to an automatic parking system and to a motor vehicle for carrying out the method.

10 Claims, 2 Drawing Sheets

(51) Int. Cl.
*E04H 6/42* (2006.01)
*G07F 17/24* (2006.01)

(56) References Cited

U.S. PATENT DOCUMENTS

| | | | |
|---|---|---|---|
| 2003/0069665 A1* | 4/2003 | Haag | E04H 6/422 |
| | | | 700/217 |
| 2012/0111937 A1 | 5/2012 | Rogich | |
| 2014/0066110 A1 | 3/2014 | Lovegreen | |
| 2016/0133133 A1 | 5/2016 | Triplett | |
| 2017/0267213 A1* | 9/2017 | Berezin | B60K 37/06 |
| 2017/0313305 A1* | 11/2017 | Irion | G08G 1/142 |
| 2017/0349146 A1* | 12/2017 | Krishnan | B60R 25/241 |
| 2018/0053422 A1 | 2/2018 | Altinger et al. | |
| 2018/0072345 A1* | 3/2018 | Nicodemus | G05D 1/0088 |
| 2018/0159686 A1* | 6/2018 | Ko | H04L 9/3228 |
| 2018/0194323 A1* | 7/2018 | Woodill, Jr. | G07C 9/00 |
| 2018/0345954 A1 | 12/2018 | Gougeon et al. | |
| 2019/0137290 A1* | 5/2019 | Levy | G01C 21/3461 |
| 2019/0217816 A1* | 7/2019 | Lee | H04W 4/80 |

FOREIGN PATENT DOCUMENTS

| | | |
|---|---|---|
| CN | 107330530 A | 11/2017 |
| DE | 102013222071 A1 | 4/2015 |
| DE | 102014205122 A1 | 9/2015 |
| DE | 102014221745 A1 | 4/2016 |
| DE | 102015209190 A1 | 11/2016 |
| DE | 102016207139 A1 | 11/2016 |
| DE | 102015121113 A1 | 6/2017 |

OTHER PUBLICATIONS

International Search Report and Written Opinion of the International Searching Authority directed to related International Patent Application No. PCT/EP2019/055713, dated May 17, 2019, with attached English-language translation; 18 pages.

Chinese Application No. 201980018415.2, Office Action dated Jul. 5, 2021; English Translation from EPO Global Dossier, 9 pages.

* cited by examiner (Stand der Technik)

METHOD FOR TRANSFERRING A MOTOR VEHICLE TO AN AUTOMATIC PARKING SYSTEM, AUTOMATIC PARKING SYSTEM, AND MOTOR VEHICLE

TECHNICAL FIELD

The disclosure relates to a method for transferring a motor vehicle to an automatic parking system which is designed to transfer the motor vehicle to a free parking space of the parking system without a driver.

BACKGROUND

A method and system for monitoring a motor vehicle in a parking lot is known from prior art DE 10 2014 221 745 A1, for example. As shown schematically in FIG. 1, the parking system 1 comprises a parking lot 2 having an entrance 4, an exit 6, and having a plurality of parking spaces 8. A motor vehicle 10 is driven by a motor vehicle user to a transfer zone 12 of the parking lot 2 and transferred to a parking lot operator. The motor vehicle 10 is then transferred either autonomously or by personnel to a free parking space 14. Upon request by the motor vehicle user, the motor vehicle 10 is transferred to a pick-up zone 16 by the parking lot operator and is received again by the motor vehicle user.

Furthermore, DE 10 2015 209 190 A1 disclose a method for the user-defined provision of a motor vehicle, in which the trajectory of the motor vehicle is stored until it reaches a parking position, so that the motor vehicle can be picked up again at any point in the trajectory.

DE 10 2014 205 122 A1, on the other hand, describes an arrangement for monitoring an autonomous movement of a motor vehicle. In this case, a request signal is output by the motor vehicle to a motor vehicle user, wherein the autonomous driving is carried out as a function of a response signal from the motor vehicle user.

DETAILED DESCRIPTION

Figure 1:
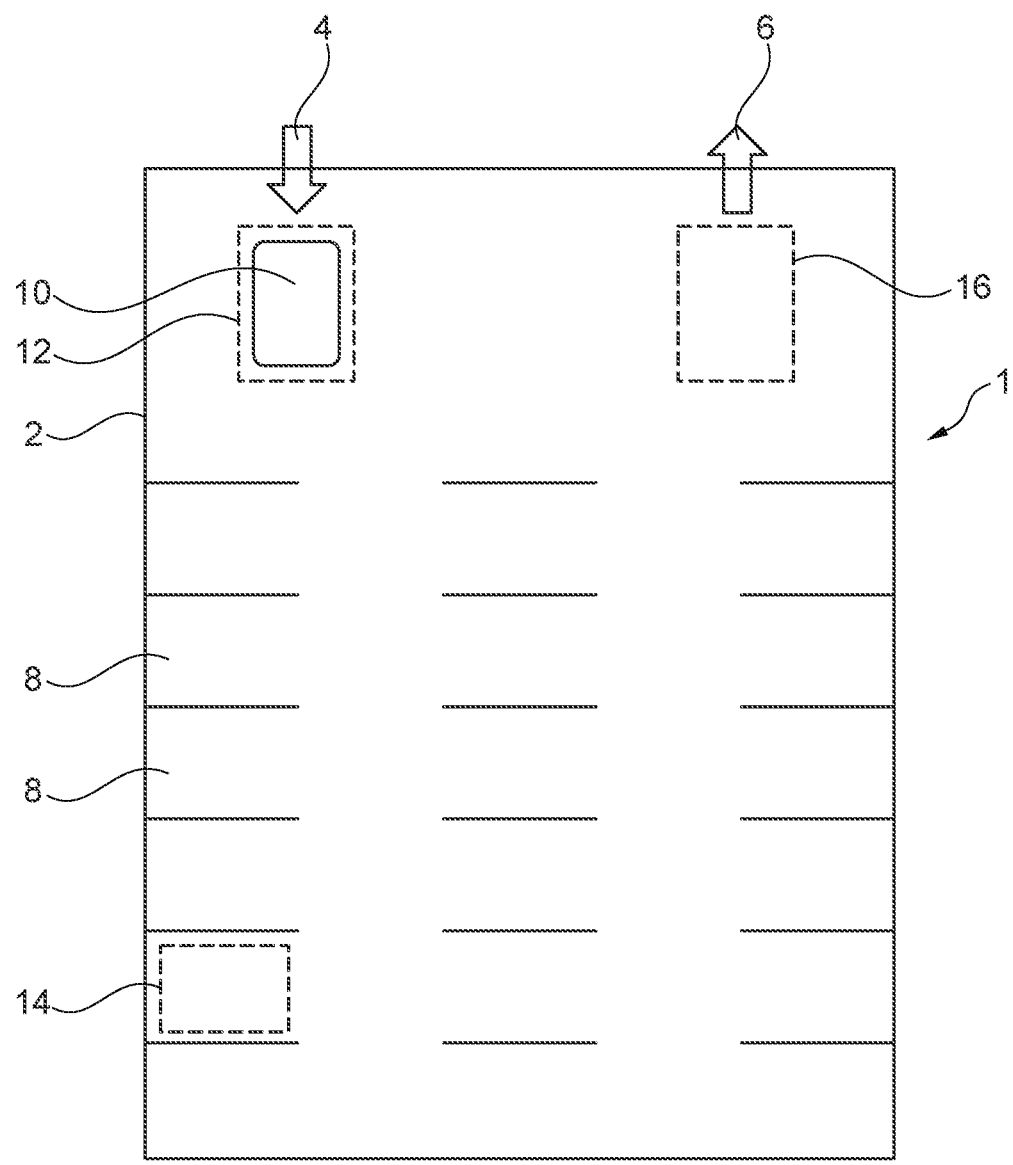
FIG. 1 is a schematic view of a parking system for transferring a motor vehicle without a driver to a free parking space according to the prior art.

The disclosure relates to a method for transferring a motor vehicle to an automatic parking system which is designed to transfer the motor vehicle to a free parking space of the parking system without a driver. The disclosure further relates to the automatic parking system and a motor vehicle for use in the parking system.

A method and system for monitoring a motor vehicle in a parking lot is known from prior art DE 10 2014 221 745 A1, for example. As shown schematically in FIG. 1, the parking system 1 comprises a parking lot 2 having an entrance 4, an exit 6, and having a plurality of parking spaces 8. A motor vehicle 10 is driven by a motor vehicle user to a transfer zone 12 of the parking lot 2 and transferred to a parking lot operator. The motor vehicle 10 is then transferred either autonomously or by personnel to a free parking space 14. Upon request by the motor vehicle user, the motor vehicle 10 is transferred to a pick-up zone 16 by the parking lot operator and is received again by the motor vehicle user.

Furthermore, DE 10 2015 209 190 A1 discloses a method for the user-defined provision of a motor vehicle, in which the trajectory of the motor vehicle is stored until it reaches a parking position, so that the motor vehicle can be picked up again at any point in the trajectory.

DE 10 2014 205 122 A1, on the other hand, describes an arrangement for monitoring an autonomous movement of a motor vehicle. In this case, a request signal is output by the motor vehicle to a motor vehicle user, wherein the autonomous driving is carried out as a function of a response signal from the motor vehicle user.

The object of the present disclosure is to provide an improved method for transferring a motor vehicle to an automatic parking system, an automatic parking system, and a motor vehicle for use in the automatic parking system.

This object is achieved by a method with the features of claim 1, a parking system with the features of claim 6, and by a motor vehicle with the features of claim 7. Advantageous embodiments with expedient developments of the disclosure are specified in the dependent claims.

The method according to the disclosure for transferring a motor vehicle to an automatic parking system which is designed to transfer the motor vehicle to a free parking space of the parking system without a driver is characterized in that the parking system transmits a release code to the motor vehicle, said release code being output in the motor vehicle so as to be perceivable to a motor vehicle user. According to the disclosure, the motor vehicle user in turn transmits this release code to the parking system after leaving the motor vehicle in order to thereby grant a drive release. As soon as the drive release is granted, the motor vehicle is transferred to the free parking space of the parking system without the driver.

Since the motor vehicle user has to perform a conscious action by entering the release code in order to initiate the autonomous transfer of the motor vehicle to a free parking space, the transferring of the motor vehicle advantageously takes place in a particularly fail-safe manner. Accidental release is almost impossible. In addition, the entry of the release code offers a possibility of securely assigning the motor vehicle and the motor vehicle user to one another, so that the transfer of the motor vehicle is also particularly fail-safe in this regard. In particular, improper release of the motor vehicle by a third party is avoided, since only the driver knows the release code.

A determined sequence of alphanumeric characters is preferably transmitted as the release code.

The release code is preferably selected in such a way that it cannot be derived from the external circumstances of the parking process. In particular, it does not contain any information which (without knowledge of the assignment stored in the parking system) permits identification of the motor vehicle, the vehicle user (or, for example, a mobile device thereof) or the assigned parking lot. In this embodiment of the disclosure, the release code contains, for example, no information about the registration number of the motor vehicle, the name or the telephone number of the vehicle user and the identifier or position of the parking lot. Instead, the release code can be formed in the context of the disclosure, for example, by a consecutive number or a randomly selected character string. The fact that the release code cannot be associated with the external circumstances of the parking process, in particular the motor vehicle, the vehicle user or the parking lot, ensures particularly high security against errors and misuse.

The release code is preferably output in a visually perceivable manner on a display unit arranged in the interior of the motor vehicle. In an alternative but also preferred embodiment, the release code is output in an acoustically perceivable manner by means of a loudspeaker.

In order to transmit the release code to the parking system, a mobile input device, in particular a mobile radio device, is preferably used. The input device has corresponding software (in the case of a mobile radio device, a corresponding "smartphone app"), which allows the motor vehicle user to enter the release code and transmit it to the parking system. In an alternative but also preferred embodiment, the release code is input into a stationary terminal which is part of the parking system. The data transmission can then in particular also take place via a line.

In a preferred embodiment, the motor vehicle user transmits the release code when he has parked and left the motor vehicle in a transfer zone of the parking system provided for this purpose. This advantageously ensures a defined starting position for the parking system when the motor vehicle is picked-up.

The automatic parking system according to the disclosure, which is designed to transfer a motor vehicle to a free parking space of the parking system without a driver, is characterized by a control and communication unit which is designed to transmit a release code to a communication unit of the motor vehicle. The control and communication unit is additionally designed to receive the release code again. Finally, the control and communication unit is designed to initiate the transfer of the motor vehicle without a driver only after the release code has been received.

The motor vehicle according to the disclosure for use in the parking system described above, which is designed to be transferred to a free parking space by the parking system without a driver, is characterized by a communication unit which is designed to receive a release code transmitted by the parking system and output in a perceivable manner to the motor vehicle user.

The advantages and preferred embodiments described for the method according to the disclosure also apply to the parking system according to the disclosure and to the motor vehicle according to the disclosure.

The features and feature combinations mentioned above in the description, as well as the features and feature combinations mentioned below in the description of the figures and/or shown only in the figures, can be used not only in the respectively specified combination but also in other combinations or in isolation without getting out of the scope of the disclosure. Embodiments of the disclosure, which are not explicitly shown or explained in the figures but derive therefrom and can be produced by separated combinations of features from the embodiments explained, are thus to be regarded as included and disclosed.

Further advantages, features and details of the disclosure will become apparent from the claims, the following description of preferred embodiments and from the drawings.

FIG. 1 is a schematic view of a parking system for transferring a motor vehicle without a driver to a free parking space according to the prior art.

Figure 2:
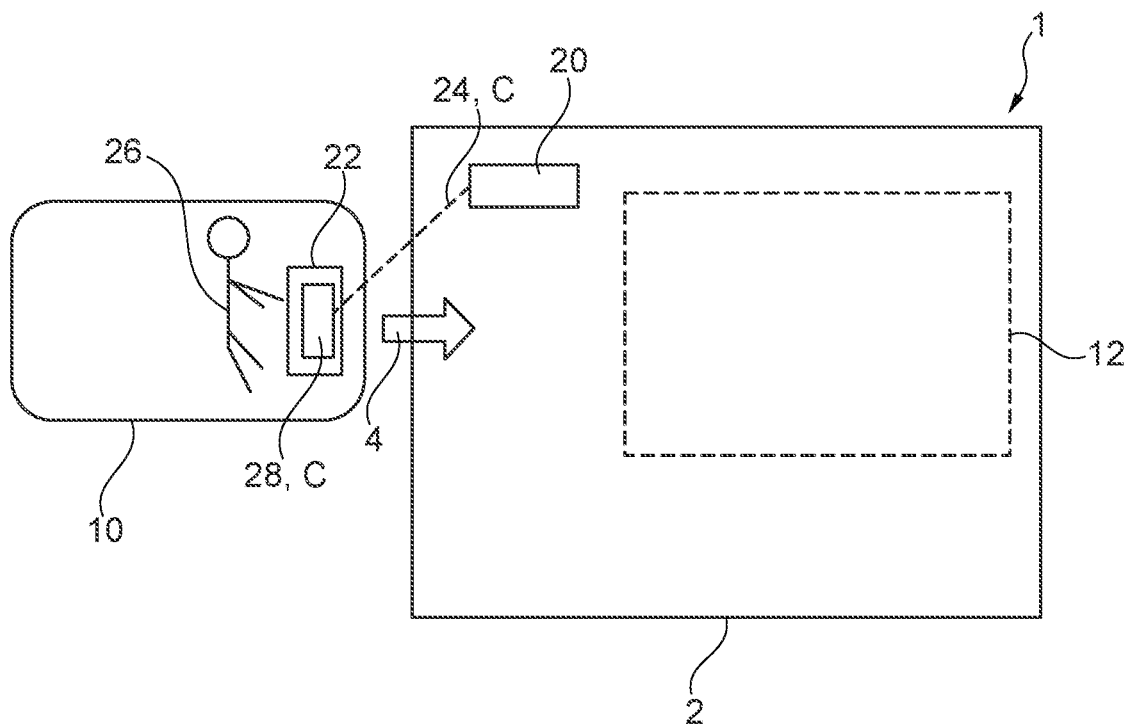
FIG. 2 shows a first step of a method for transferring a motor vehicle to the parking system for transfer to a free parking space without a driver.

FIG. 2 shows a first step of a method for transferring a motor vehicle to the parking system for transfer to a free parking space without a driver.

Figure 3:
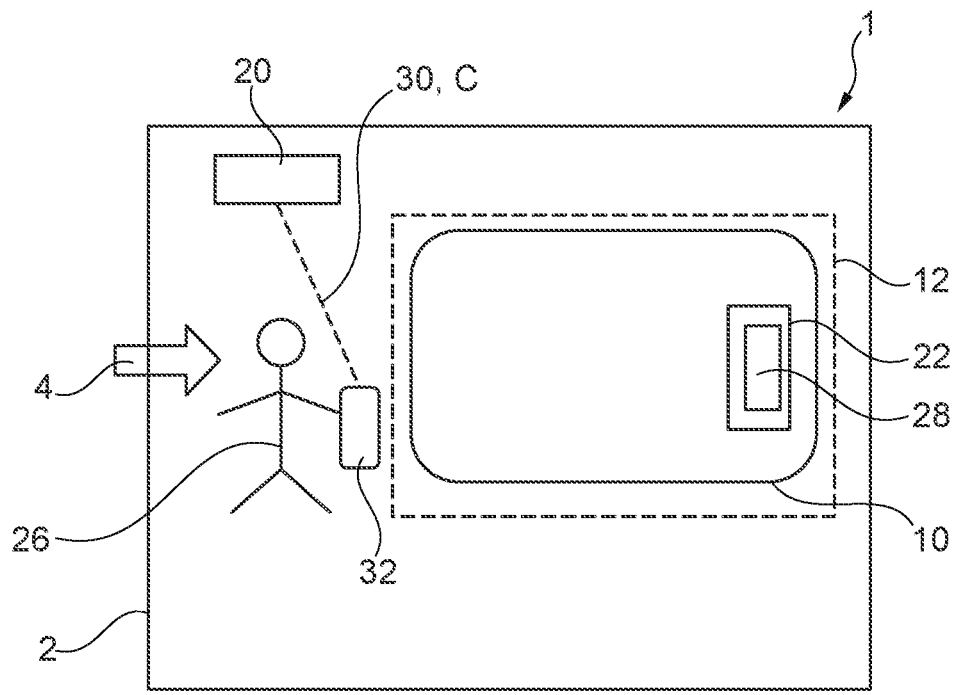
FIG. 3 shows a second step of the method according to FIG. 2.

FIG. 3 shows a second step of the method according to FIG. 2.

Corresponding parts are always provided with the same reference signs in all figures.

To explain the parking system 1 shown in FIG. 1 according to the prior art, reference is made to the introduction to the description.

FIGS. 2 and 3 each show an entrance region of a parking system 1 according to the disclosure, wherein successive steps of the method according to the disclosure for transferring a motor vehicle 10 to the parking system 1 are shown.

The parking system 1 according to the disclosure is substantially constructed as shown in FIG. 1. The parking system 1 is also referred to as "autonomous valet parking" (AVP). The parking system 1 comprises a parking lot 2, which can be formed by any parking infrastructure within the scope of the disclosure, in particular also by a parking garage or an underground car park.

The parking system 1 comprises a control and communication unit 20 on the parking system side, which is designed to establish a data connection 24 to a communication unit 22 on the motor vehicle side.

If a motor vehicle 10, as shown in FIG. 2, approaches the entrance 4 of the parking system 1, the data connection 24 between the motor vehicle 10 and the parking system 1 is established by radio. The control and communication unit 22 transmits an alphanumeric release code C to the motor vehicle 10 via this data connection 24. The release code C is shown to a motor vehicle user 26 in the interior of the motor vehicle 10 on a display 28 of the control and communication unit 22. The motor vehicle user 26 is asked to remember the release code C.

The motor vehicle user 26 drives the motor vehicle 10 to the transfer zone 12 and leaves the motor vehicle 10, as indicated in FIG. 3. In order to signal to the parking system 1 that the motor vehicle 10 is now released for autonomous transfer to a free parking space 14, the motor vehicle user 26 transmits the release code C via a data connection 30 to the control and communication unit 20 of the parking system 1. For this purpose, he uses a mobile input device 32, which is preferably provided by a mobile radio device ("smartphone").

After the control and communication unit 20 has detected the release code C, the motor vehicle 10 is controlled by the parking system 1 to maneuver to a free parking space 14 of the parking lot 2 without a driver. For this purpose, the control and communication unit 20 controls the motor vehicle 10, specifically its drive and steering, to drive to a free parking space 14. Alternatively, the control and communication unit 20 merely provides the motor vehicle 10, specifically a control unit of the motor vehicle 10, with information about where a free parking space 14 is located, and the motor vehicle 10 drives autonomously to this parking space.

The invention claimed is:

1. A method for transferring a motor vehicle in a parking system, the method comprising:
   transmitting, by the parking system, a release code to the motor vehicle;
   outputting, by the motor vehicle, the release code to a driver of the motor vehicle in a perceivable manner;
   transmitting, by the driver, the release code to the parking system in order to grant a drive release for autonomous transferring of the motor vehicle; and
   in response to granting the drive release, transferring, by the parking system, the motor vehicle to a free parking space of the parking system without the driver.

2. The method according to claim 1, wherein the release code is a sequence of alphanumeric characters.

3. The method according to claim 1, further comprising outputting the release code on a display unit in an interior of the motor vehicle.

4. The method according to claim 1, wherein the transmitting the release code includes transmitting the release code to the parking system by the driver using a mobile input device.

5. The method according to claim 1, further comprising:
parking, by the driver, the motor vehicle in a transfer zone of the parking system; and
in response to the parking, transmitting, by the driver, the release code.

6. The method according to claim 1, further comprising establishing, by a radio of the parking system, a data connection between the parking system and a mobile input device of the driver, wherein the data connection is used to facilitate the transmitting, by the driver, the release code to the parking system.

7. An automatic parking system configured to transfer a motor vehicle without a driver to a free parking space of the automatic parking system, the automatic parking system comprising:
a controller and a radio configured to:
transmit a release code to a communication unit of the motor vehicle;
receive the release code from a driver of the motor vehicle for autonomous transferring of the motor vehicle; and
in response to receiving the release code, transfer the motor vehicle to the free parking space without the driver.

8. The automatic parking system of claim 7, wherein the radio is further configured to establish a data connection between the automatic parking system and a mobile input device of the driver, and wherein the data connection is used to facilitate the receiving the release code from the driver.

9. A motor vehicle for use in a parking system, wherein the motor vehicle is configured to be transferred by the parking system to a free parking space without a driver, the motor vehicle comprising a controller and a radio configured to:
receive a release code transmitted by the parking system for autonomous transferring of the motor vehicle; and
output the release code to a driver of the motor vehicle in a perceivable manner.

10. The motor vehicle of claim 9, wherein the radio is further configured to establish a data connection between the parking system and the motor vehicle, and wherein the data connection is used to facilitate the receiving the release code transmitted by the parking system.

* * * * *